(12) United States Patent
Yoon et al.

(10) Patent No.: US 11,042,057 B2
(45) Date of Patent: Jun. 22, 2021

(54) PRESSURE DETECTION MODULE AND TOUCH INPUT DEVICE INCLUDING THE SAME

(71) Applicant: HiDeep Inc., Seongnam-si (KR)

(72) Inventors: Sangsic Yoon, Gyeonggi-do (KR); Sunyoung Kwon, Gyeonggi-do (KR); Hojun Moon, Gyeonggi-do (KR); Taehoon Kim, Gyeonggi-do (KR); Won Woo Lee, Gyeonggi-do (KR); Seyeob Kim, Gyeonggi-do (KR); Bonkee Kim, Gyeonggi-do (KR)

(73) Assignee: HIDEEP INC., Gyeonggi-Do (KR)

( * ) Notice: Subject to any disclaimer, the term of this patent is extended or adjusted under 35 U.S.C. 154(b) by 0 days.

(21) Appl. No.: 14/931,308

(22) Filed: Nov. 3, 2015

(65) Prior Publication Data

US 2016/0299598 A1 Oct. 13, 2016

(30) Foreign Application Priority Data

Apr. 13, 2015 (KR) ........................ 10-2015-0051785

(51) Int. Cl.
*G06F 3/044* (2006.01)
*G02F 1/1333* (2006.01)
*G06F 1/16* (2006.01)

(52) U.S. Cl.
CPC ........ *G02F 1/13338* (2013.01); *G06F 1/1652* (2013.01); *G06F 3/0446* (2019.05); *G06F 3/0447* (2019.05)

(58) Field of Classification Search
CPC ......... G06F 2203/04102; G06F 3/0414; G06F 3/0446; G06F 3/0447; G06F 1/1652; G06F 3/044; G02F 1/13338
See application file for complete search history.

(56) References Cited

U.S. PATENT DOCUMENTS 9,201,105 B2 12/2015 Iida et al.
10,007,380 B2 6/2018 Yoon et al.
(Continued)

FOREIGN PATENT DOCUMENTS

CN 102279687 A 12/2011
JP 2009-534757 A 9/2009
(Continued)

OTHER PUBLICATIONS

Office Action dated Nov. 17, 2015 in related Japanese Appl. 2015-216068 (3 pgs.).
(Continued)

*Primary Examiner* — Jeff Piziali
(74) *Attorney, Agent, or Firm* — Foley & Lardner LLP

(57) ABSTRACT

A pressure detection module may be provided that includes: a first electrode and a second electrode which are located on an insulation layer; and an elastic foam. The elastic foam is located between the first and the second electrodes and a reference potential layer located apart from the pressure detection module. A capacitance between the first electrode and the second electrode is changed according to a relative distance change between the reference potential layer and the first and the second electrodes through a transformation of the elastic foam. A magnitude of a pressure which causes the elastic foam to be transformed is detected according to the capacitance change.

12 Claims, 16 Drawing Sheets

(56) References Cited

U.S. PATENT DOCUMENTS

| | | | | |
|---|---|---|---|---|
| 2004/0217945 | A1* | 11/2004 | Miyamoto | G06F 3/0412 345/173 |
| 2007/0013678 | A1* | 1/2007 | Nakajima | G06F 3/045 345/174 |
| 2007/0257821 | A1* | 11/2007 | Son | G06F 3/016 341/22 |
| 2008/0018611 | A1* | 1/2008 | Serban | G06F 3/0416 345/173 |
| 2008/0127739 | A1* | 6/2008 | DeAngelis | G01L 1/146 73/718 |
| 2010/0103127 | A1* | 4/2010 | Park | G06F 3/04886 345/173 |
| 2010/0109486 | A1* | 5/2010 | Polyakov | G06F 3/0202 310/365 |
| 2011/0227866 | A1* | 9/2011 | Kawaguchi | G06F 3/044 345/174 |
| 2012/0038583 | A1* | 2/2012 | Westhues | G06F 3/0412 345/174 |
| 2012/0056826 | A1* | 3/2012 | Kim | G06F 3/016 345/173 |
| 2013/0009653 | A1 | 1/2013 | Fukushima | |
| 2013/0082970 | A1* | 4/2013 | Frey | G06F 3/0414 345/173 |
| 2013/0234734 | A1 | 9/2013 | Iida et al. | |
| 2014/0009441 | A1* | 1/2014 | Bernstein | G06F 3/016 345/174 |
| 2014/0253454 | A1* | 9/2014 | Caldwell | G06F 3/0219 345/168 |
| 2015/0212579 | A1* | 7/2015 | Nakamura | G06F 1/1626 345/173 |
| 2016/0092015 | A1* | 3/2016 | Al-Dahle | G06F 3/044 345/174 |
| 2016/0188039 | A1 | 6/2016 | Yoon et al. | |

FOREIGN PATENT DOCUMENTS

| | | |
|---|---|---|
| JP | 2012-178050 A | 9/2012 |
| JP | 2013-020370 A | 1/2013 |
| KR | 20140080596 A | 7/2014 |
| KR | 10-1452302 | 10/2014 |
| KR | 10-1506511 | 4/2015 |
| TW | 201347006 A | 11/2013 |
| WO | WO 2013/132736 A1 | 9/2013 |
| WO | WO 2014/080924 A1 | 5/2014 |
| WO | WO-2015/016562 A1 | 2/2015 |

OTHER PUBLICATIONS

Office Action dated Feb. 9, 2016 in related Japanese Appl. 2015-216068 (2 pgs.).
Office Action dated Oct. 30, 2015 in related Korean Appl. 10-2015-0051785 (7 pgs.).
Office Action dated Jan. 24, 2017 in related Japanese Appl. No. 2015-216068 (3 pgs.).
Office Action dated Jun. 27, 2018 in related Chinese Appl. 201510781721.5 (12 pgs.).

* cited by examiner

[Fig. 1]
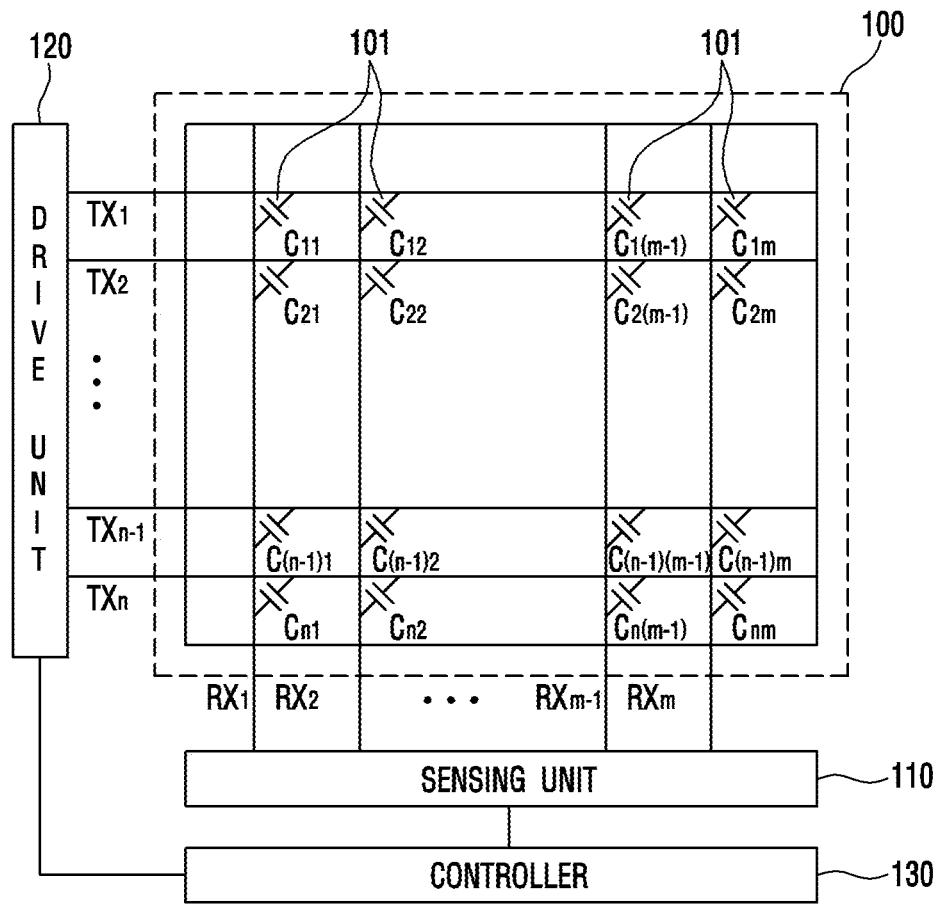
[Fig. 2a]
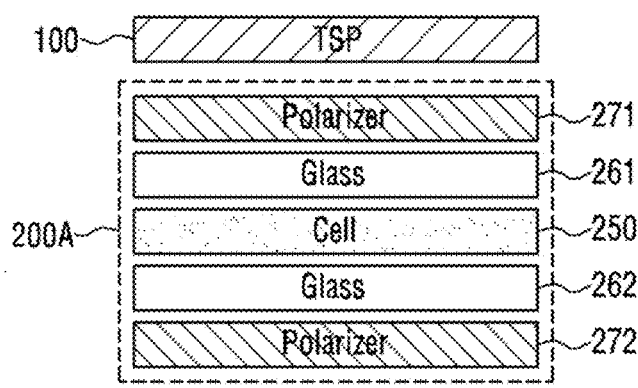

[Fig. 2b]
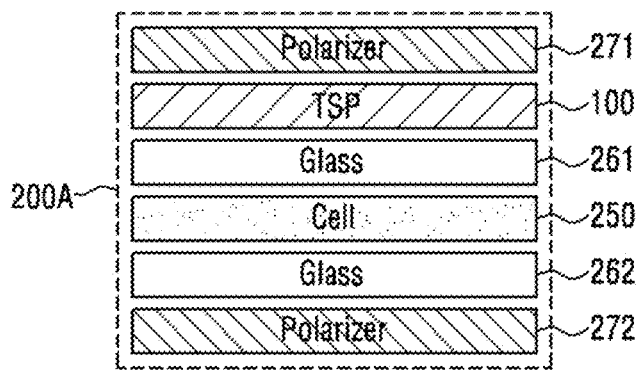
[Fig. 2c]
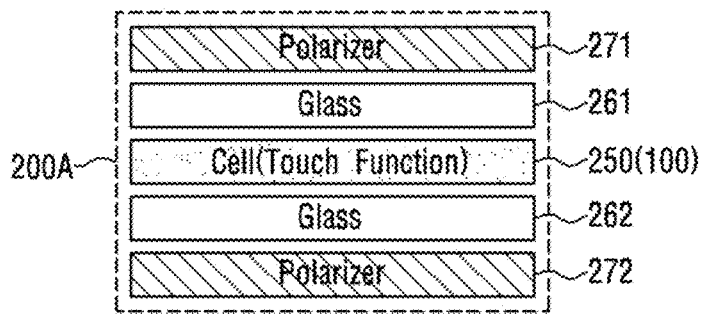
[Fig. 3]
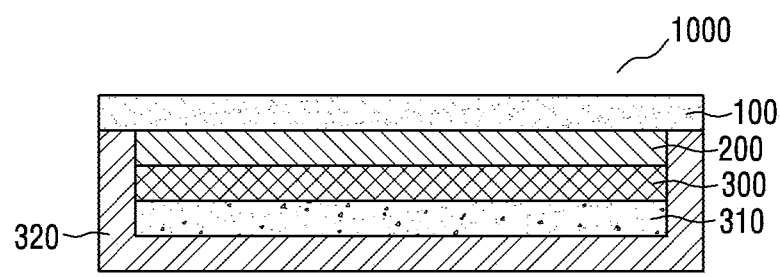

[Fig. 4a]
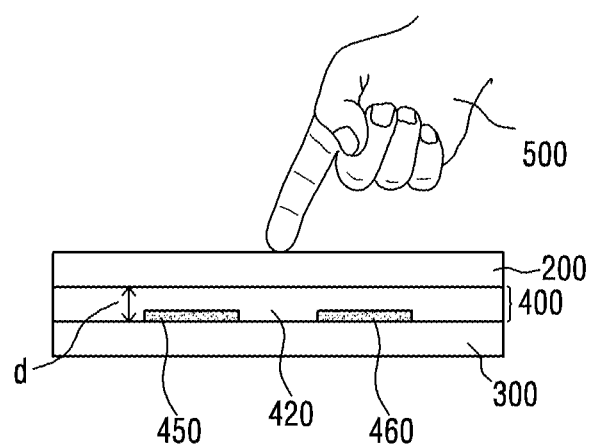
[Fig. 4b]
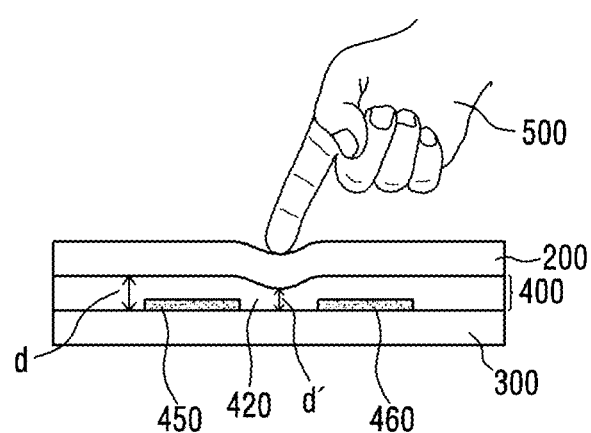

[Fig. 4c]
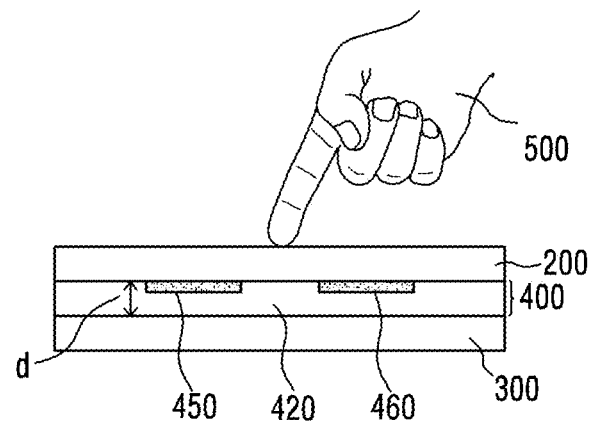
[Fig. 4d]
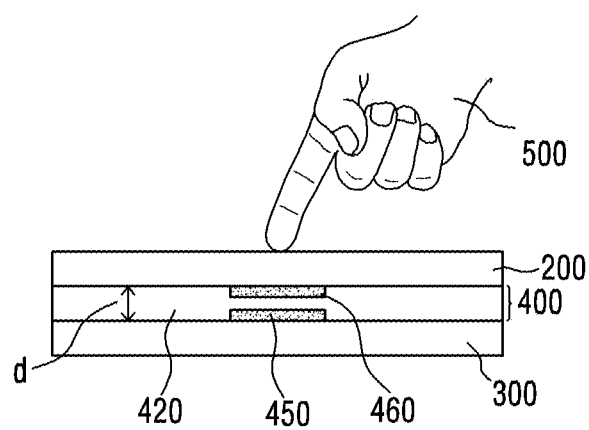
[Fig. 5a]
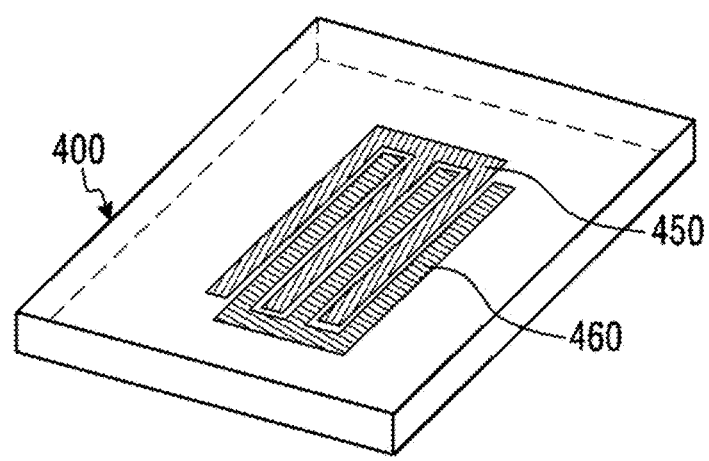

[Fig. 5b]
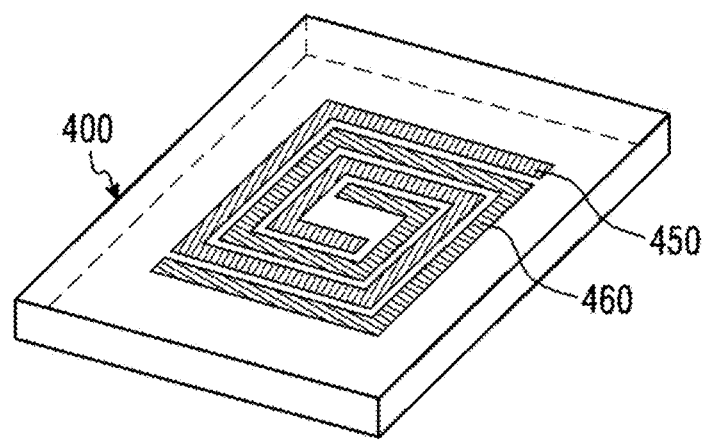
[Fig. 5c]
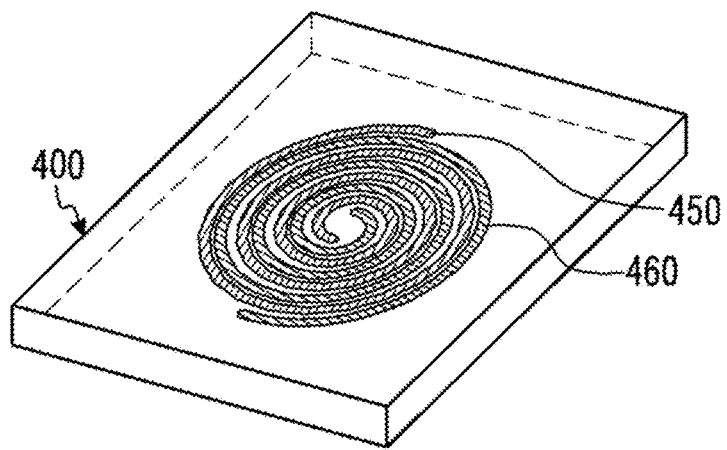

[Fig. 5d]
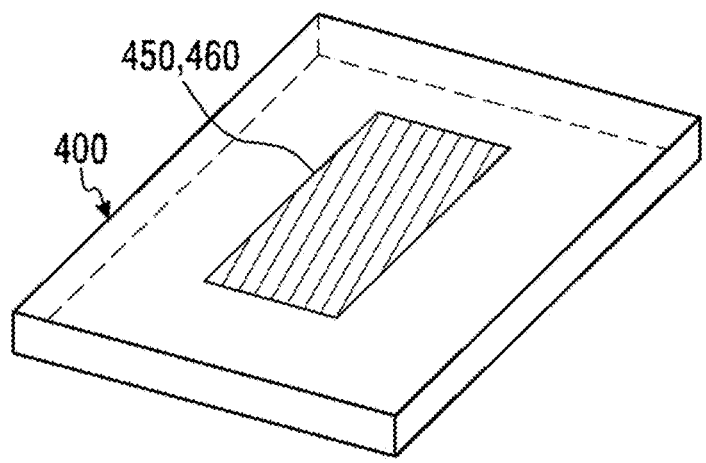
[Fig. 5e]
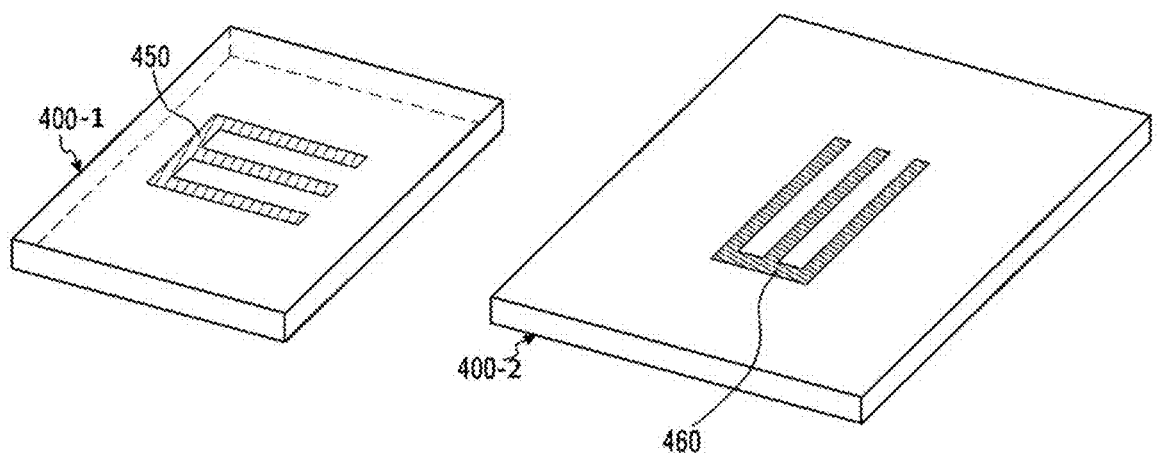
[Fig. 6a]
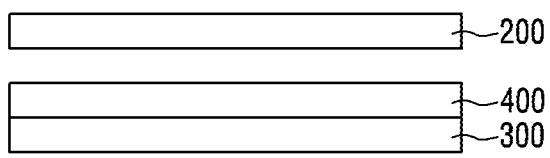

[Fig. 6b]
[Fig. 7a]
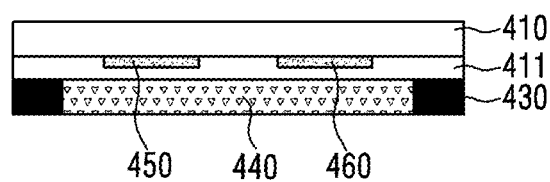
[Fig. 7b]
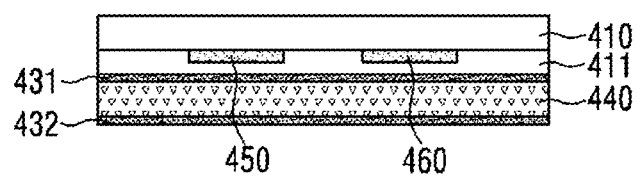
[Fig. 7c]
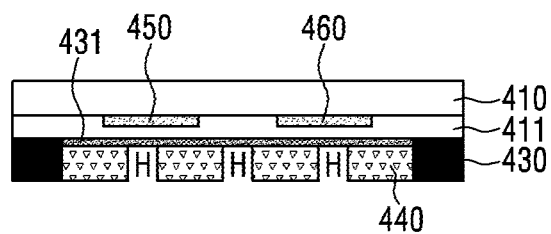

[Fig. 7d]
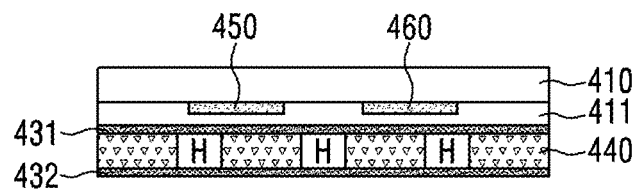
[Fig. 7e]
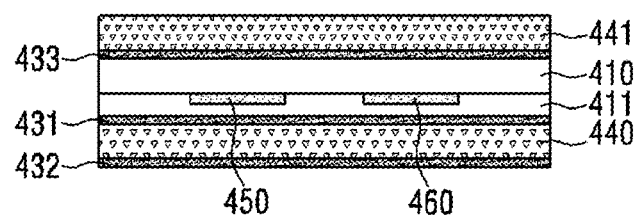
[Fig. 7f]
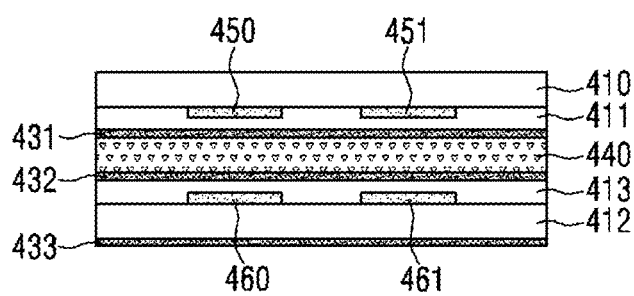
[Fig. 8a]
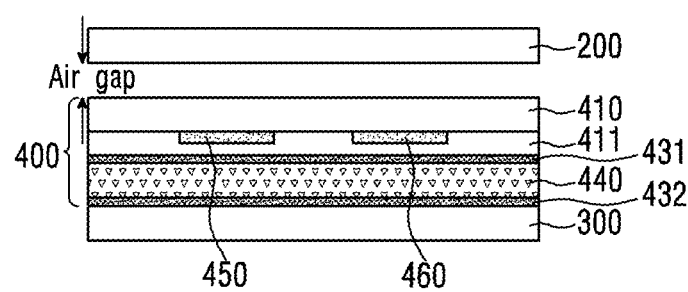

[Fig. 8b]
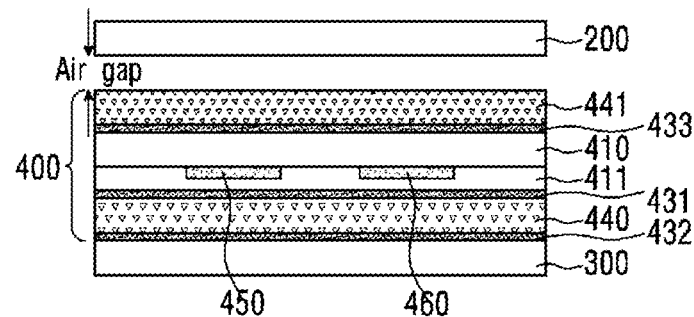
[Fig. 9a]
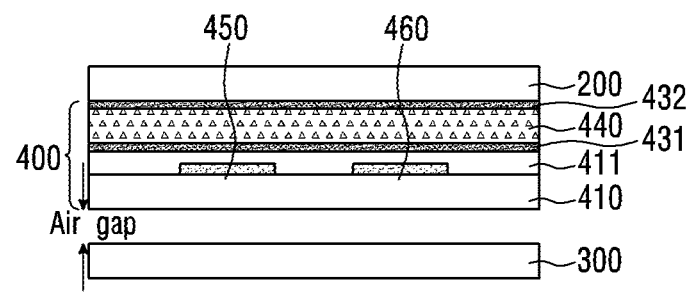
[Fig. 9b]
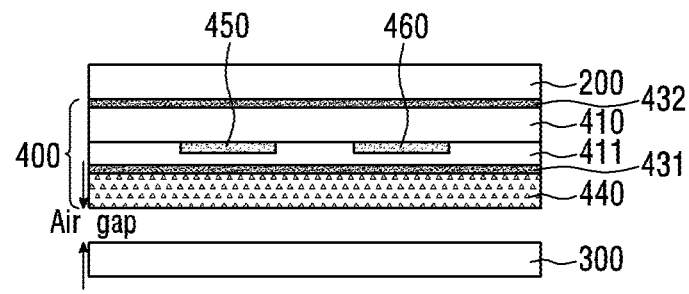

[Fig. 10a]
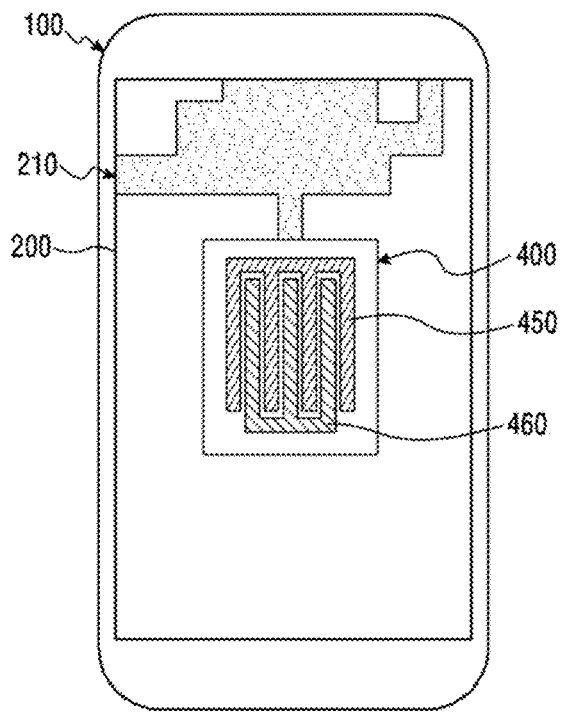
[Fig. 10b]
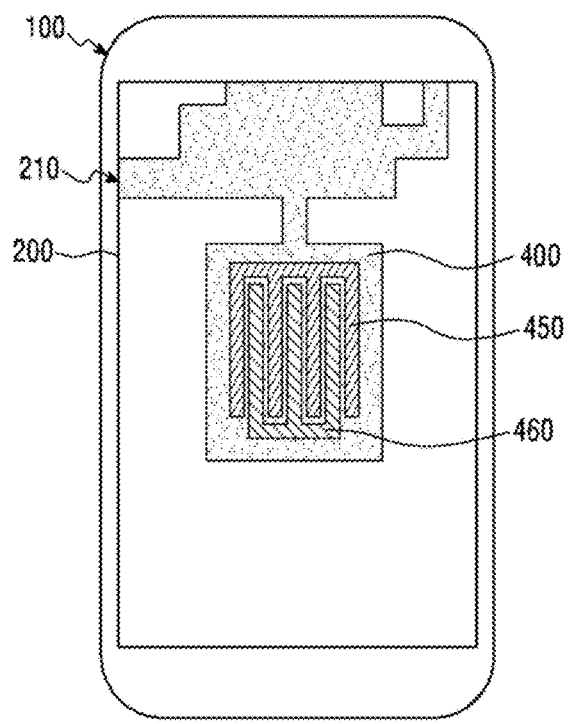

[Fig. 11a]
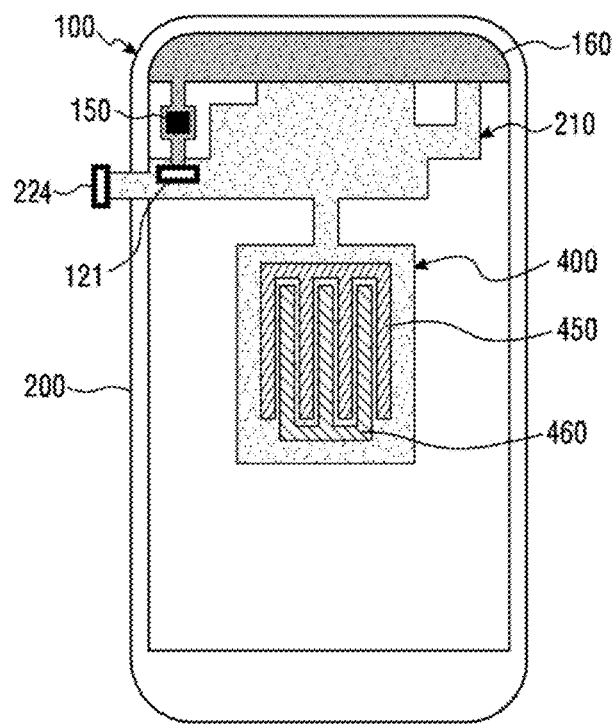
[Fig. 11b]
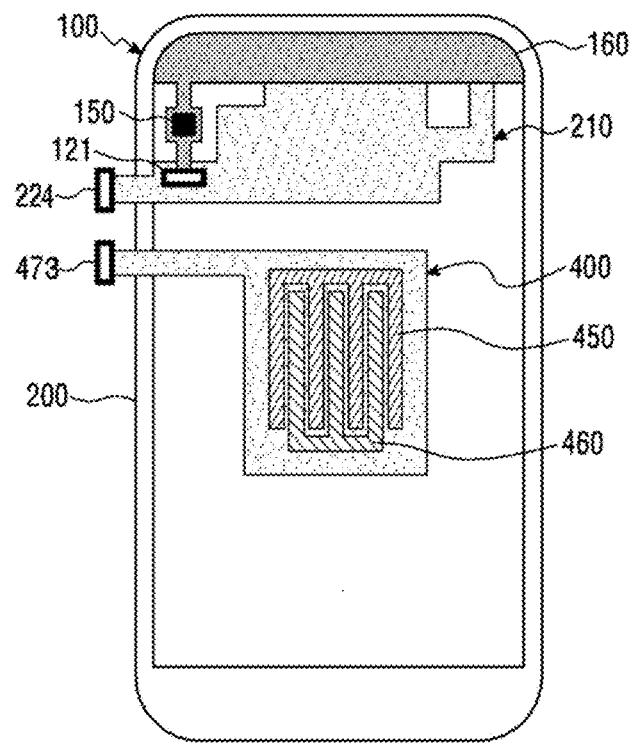

[Fig. 11c]
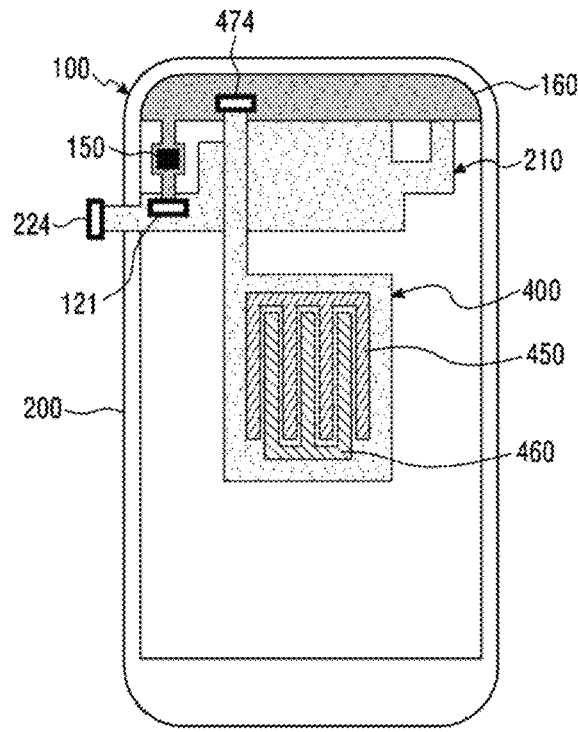
[Fig. 12a]
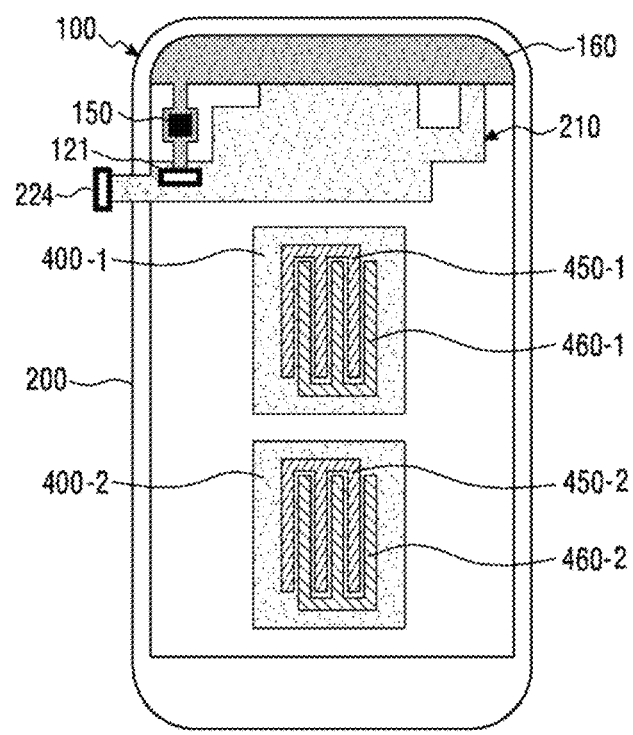

[Fig. 12b]
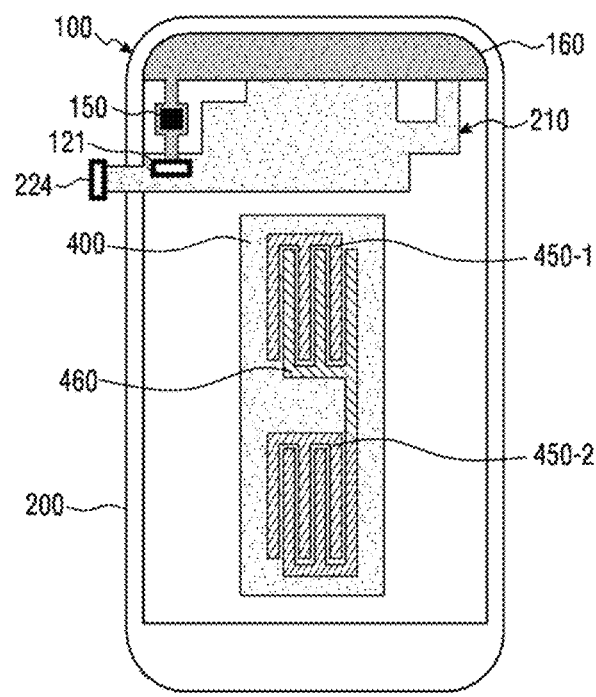
[Fig. 12c]
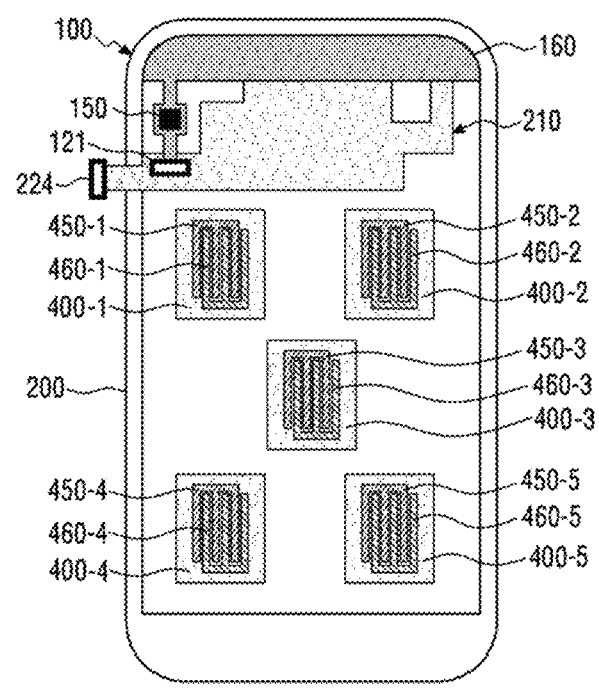

[Fig. 13a]
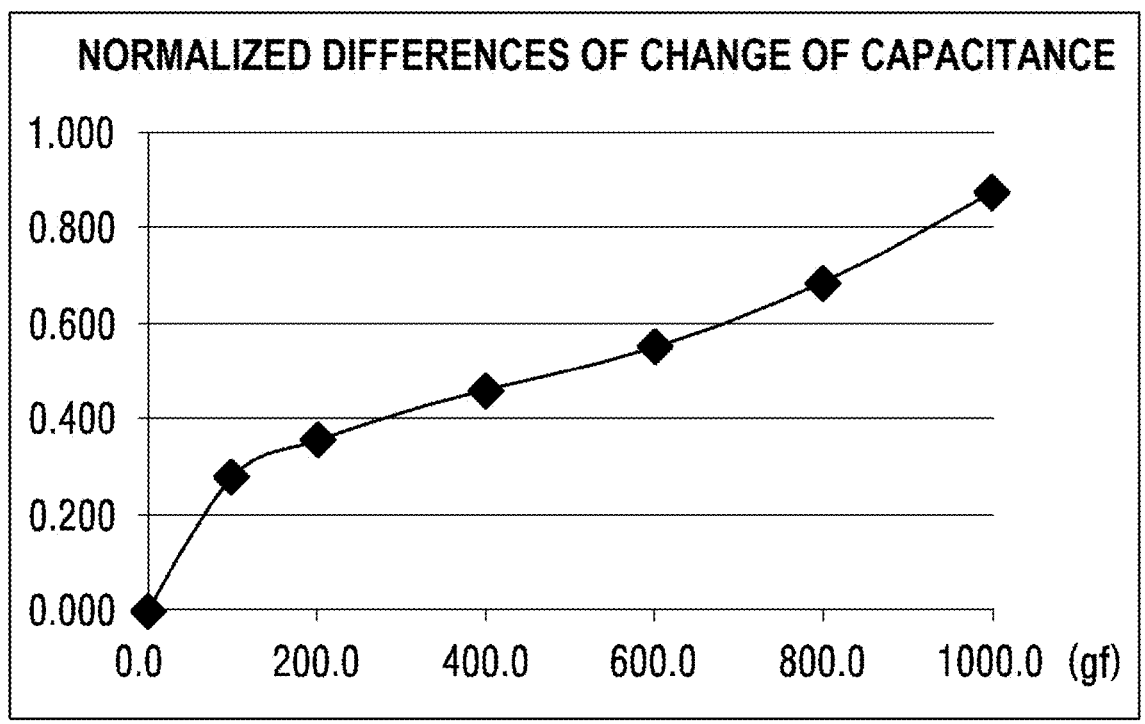

[Fig. 13b]
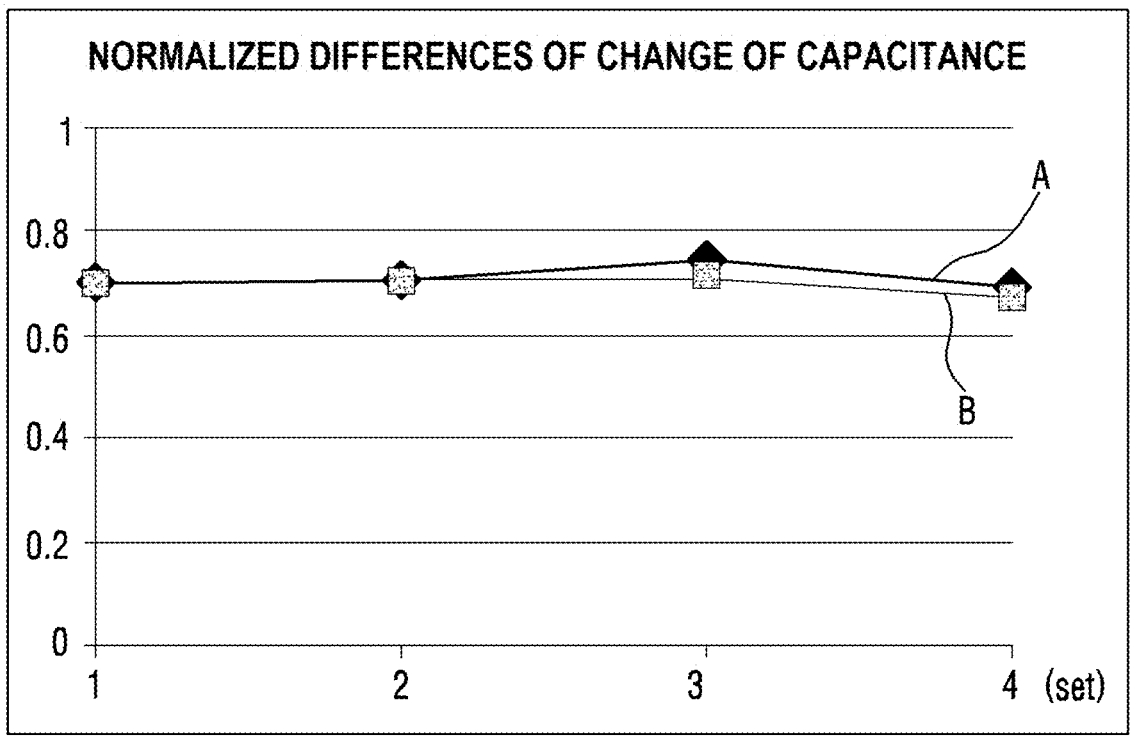
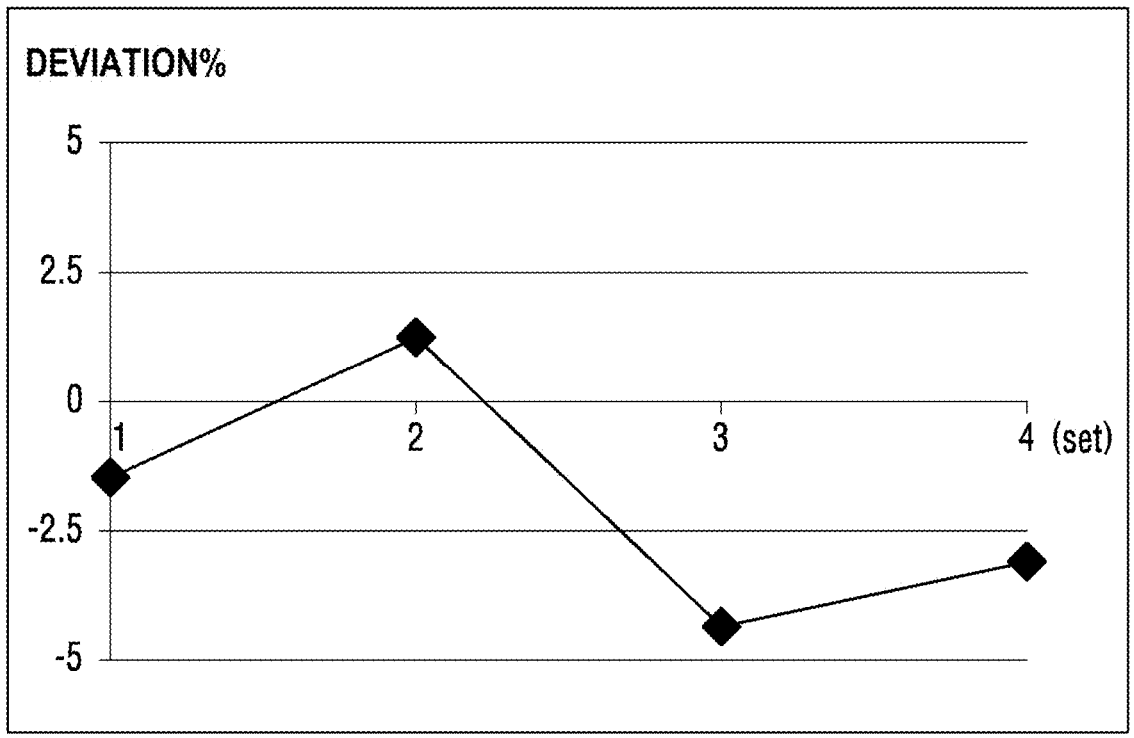

[Fig. 13c]
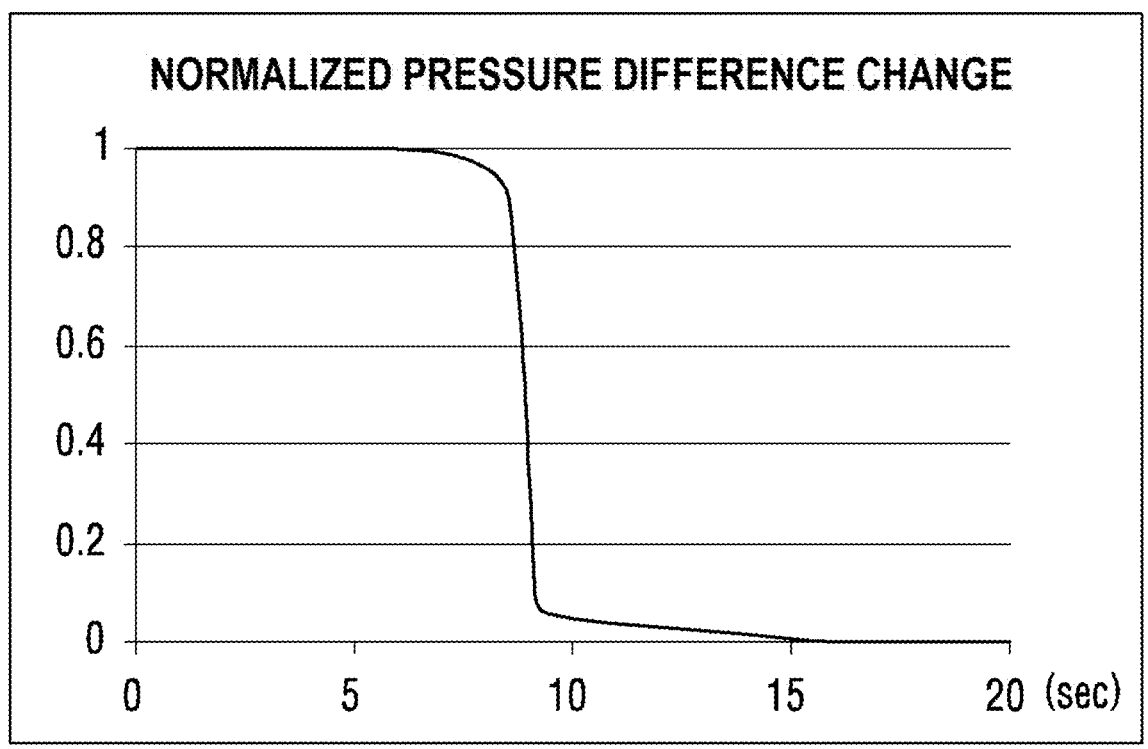

PRESSURE DETECTION MODULE AND TOUCH INPUT DEVICE INCLUDING THE SAME

BACKGROUND

Field

The present invention relates to a pressure detection module for detecting a pressure and a smartphone including the same, and more particularly to a pressure detection module which is applied to a smartphone configured to detect a touch position and is capable of detecting a touch pressure, and the smartphone including the same.

Description of Related Art

Various kinds of input devices are being used to operate a computing system. For example, the input device includes a button, key, joystick and touch screen. Since the touch screen is easy and simple to operate, the touch screen is increasingly being used in operation of the computing system.

The touch screen may constitute a touch surface of a touch input device including a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the touch screen by a finger, etc. Generally, the computing system recognizes the touch and the touch position on the touch screen and analyzes the touch, and thus, performs the operations in accordance with the analysis.

Here, there is a demand for a touch input device capable of detecting not only the touch position according to the touch on the touch screen but the magnitude of the touch pressure.

SUMMARY

One embodiment is a pressure detection module that includes: a first electrode and a second electrode which are located on an insulation layer; and an elastic foam. The elastic foam is located between the first and the second electrodes and a reference potential layer located apart from the pressure detection module. A capacitance between the first electrode and the second electrode is changed according to a relative distance change between the reference potential layer and the first and the second electrodes through a transformation of the elastic foam. A magnitude of a pressure which causes the elastic foam to be transformed is detected according to the capacitance change.

Another embodiment is a pressure detection module that includes: an electrode which is located on an insulation layer; and an elastic foam. The elastic foam is located between the electrode and a reference potential layer located apart from the pressure detection module. A capacitance between the electrode and the reference potential layer is changed according to a relative distance change between the reference potential layer and the electrode through a transformation of the elastic foam. A magnitude of a pressure which causes the elastic foam to be transformed is detected according to the capacitance change.

Further another embodiment is a pressure detection module that includes: a first electrode which is located on a first insulation layer; a second electrode which is located on a second insulation layer; and an elastic foam which is located between the first electrode and the second electrode. A capacitance between the first electrode and the second electrode is changed according to a relative distance change between the first electrode and the second electrode through a transformation of the elastic foam. A magnitude of a pressure which causes the elastic foam to be transformed is detected according to the capacitance change.

BRIEF DESCRIPTION OF THE DRAWINGS

FIG. 1 is a schematic view of a configuration of a capacitance type touch sensor panel and the operation thereof;

FIGS. 2a, 2b and 2c are conceptual views showing a relative position of the touch sensor panel with respect to a display module in a touch input device;

FIG. 3 is a cross sectional view of the touch input device according to the embodiment of the present invention;

FIGS. 4a to 4d show examples of the arrangement of pressure electrodes included in a pressure detection module which can be applied to the touch input device according to the embodiment of the present invention;

FIGS. 5a to 5e show the patterns of the pressure electrode included in the pressure detection module according to the embodiment of the present invention;

FIGS. 6a and 6b show the attachment position of the pressure detection module to the touch input device according to the embodiment of the present invention;

FIGS. 7a to 7f show a structural cross section of the pressure detection module according to the embodiment of the present invention;

FIGS. 8a and 8b show that the pressure detection module according to the embodiment of the present invention is attached to a substrate opposite to the display module;

FIGS. 9a and 9b show that the pressure detection module according to the embodiment of the present invention is attached to the display module;

FIGS. 10a and 10b show how the pressure detection module according to the embodiment of the present invention is attached;

FIGS. 11a to 11c show how the pressure detection module according to the embodiment of the present invention is connected to a touch sensing circuit;

FIGS. 12a to 12c show that the pressure detection module according to the embodiment of the present invention includes a plurality of channels;

FIG. 13a is a graph showing capacitance change differences normalized in accordance with the weight of a pressure touch on the touch input device including the pressure detection module according to the embodiment of the present invention;

FIG. 13b is a graph which shows capacitance change differences normalized in accordance with the pressure touch before and after a predetermined number of the pressure touches occur on the touch input device including the pressure detection module according to the embodiment of the present invention, and shows deviations between the capacitance changes; and FIG. 13c is a graph showing a normalized pressure difference change which is detected by releasing the touch applied to the touch input device including the pressure detection module according to the embodiment of the present invention.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. Similar reference numerals in the drawings designate the same or similar functions in many aspects.

Hereafter, a touch input device to which a pressure detection module according to an embodiment of the present invention can be applied will be described with reference to the accompanying drawings. While a capacitance type touch sensor panel 100 is described below, the touch sensor panel 100 may be adopted, which are capable of detecting a touch position by any method.

FIG. 1 is a schematic view of a configuration of the capacitance type touch sensor panel 100 which is included in the touch input device to which the pressure detection module according to the embodiment of the present invention can be applied, and the operation of the touch sensor panel. Referring to FIG. 1, the touch sensor panel 100 may include a plurality of drive electrodes TX1 to TXn and a plurality of receiving electrodes RX1 to RXm, and may include a drive unit 120 which applies a driving signal to the plurality of drive electrodes TX1 to TXn for the purpose of the operation of the touch sensor panel 100, and a sensing unit 110 which detects the touch and the touch position by receiving a sensing signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may be formed to include at least any one of silver ink, copper, nano silver, and carbon nanotube (CNT). Also, the drive electrode TX and the receiving electrode RX may be made of metal mesh.

The drive unit 120 according to the embodiment of the present invention may apply a driving signal to the drive electrodes TX1 to TXn. In the embodiment of the present invention, one driving signal may be sequentially applied at a time to the first drive electrode TX1 to the n-th drive electrode TXn. The driving signal may be applied again repeatedly. This is only an example. The driving signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the driving signal has been applied, thereby detecting whether or not the touch has occurred and where the touch has occurred. For example, the sensing signal may be a signal coupled by the capacitance (CM) 101 generated between the receiving electrode RX and the drive electrode TX to which the driving signal has been applied. As such, the process of sensing the driving signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 120 and the sensing unit 110. For example, the controller 130 generates and transmits a drive control signal to the drive unit 120, so that the driving signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not shown) capable of detecting whether the touch has occurred on the touch sensor panel 100 or not and where the touch has occurred. The touch detection device may further include the controller 130. The touch detection device may be integrated and implemented on a touch sensing integrated circuit (IC, see reference numeral 150 of FIG. 11) in a touch input device 1000 including the touch sensor panel 100. The drive electrode TX and the receiving electrode RX included in the touch sensor panel 100 may be connected to the drive unit 120 and the sensing unit 110 included in the touch sensing IC 150 through, for example, a conductive trace and/or a conductive pattern printed on a circuit board, or the like. The touch sensing IC 150 may be placed on a circuit board on which the conductive pattern has been printed, for example, a first printed circuit board (hereafter, referred to as a first PCB) indicated by a reference numeral 160 of FIG. 11. According to the embodiment, the touch sensing IC 150 may be mounted on a main board for operation of the touch input device 1000.

As described above, a capacitance (C) with a predetermined value is generated at each crossing of the drive electrode TX and the receiving electrode RX. When an object such as finger approaches close to the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 or not and where the touch has occurred. For example, the sensing unit 110 is able to sense whether the touch has occurred on the surface of the touch sensor panel 100 comprised of a two-dimensional plane consisting of a first axis and a second axis.

More specifically, when the touch occurs on the touch sensor panel 100, the drive electrode TX to which the driving signal has been applied is detected, so that the position of the second axial direction of the touch can be detected. Likewise, when the touch occurs on the touch sensor panel 100, a capacitance change is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000 according to the embodiment of the present invention, the touch sensor panel 100 for detecting whether or not the touch has occurred and where the touch has occurred may be implemented by using not only the above-described method but also any touch sensing method like a magnetic capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

In the touch input device 1000 to which the pressure detection module according to the embodiment of the present invention can be applied, the touch sensor panel 100 for detecting where the touch has occurred may be positioned outside or inside a display module 200.

A display panel 200A included in the display module 200 of the touch input device 1000 to which the pressure detection module according to the embodiment of the present invention can be applied may be a display panel included in a liquid crystal display (LCD), a plasma display panel (PDP), an organic light emitting diode (OLED), etc. Accordingly, a user may perform the input operation by touching the touch surface while visually identifying an image displayed on the display panel. Here, the display module 200 may include a control circuit which receives an input from an application processor (AP) or a central processing unit (CPU) on a main board for the operation of the touch input device 1000 and displays the contents that the user wants on the display panel. The control circuit may be mounted on a second printed circuit board (hereafter, referred to as a second PCB) (210) in FIGS. 10a to 12c. Here, the control circuit for the operation of the display panel 200A may include a display panel control IC, a graphic controller IC, and a circuit required to operate other display panels 200A.

FIGS. 2a, 2b and 2c are conceptual views showing a relative position of the touch sensor panel with respect to the display module in the touch input device according to the embodiment of the present invention. While FIGS. 2a to 2c show an LCD panel as a display panel 200A included within the display module 200, this is just an example. Any display panel may be applied to the touch input device 1000.

In this specification, the reference numeral 200A may designate the display panel included in the display module 200. As shown in FIG. 2, the LCD panel 200A may include a liquid crystal layer 250 including a liquid crystal cell, a first glass layer 261 and a second glass layer 262 which are disposed on both sides of the liquid crystal layer 250 and include electrodes, a first polarizer layer 271 formed on a side of the first glass layer 261 in a direction facing the liquid crystal layer 250, and a second polarizer layer 272 formed on a side of the second glass layer 262 in the direction facing the liquid crystal layer 250. It is clear to those skilled in the art that the LCD panel may further include other configurations for the purpose of performing the displaying function and may be transformed.

FIG. 2a shows that the touch sensor panel 100 of the touch input device 1000 is disposed outside the display module 200. The touch surface of the touch input device 1000 may be the surface of the touch sensor panel 100. In FIG. 2a, the top surface of the touch sensor panel 100 is able to function as the touch surface. Also, according to the embodiment, the touch surface of the touch input device 1000 may be the outer surface of the display module 200. In FIG. 2a, the bottom surface of the second polarizer layer 272 of the display module 200 is able to function as the touch surface. Here, in order to protect the display module 200, the bottom surface of the display module 200 may be covered with a cover layer (not shown) such as glass.

FIGS. 2b and 2c show that the touch sensor panel 100 of the touch input device 1000 is disposed inside the display panel 200A. Here, in FIG. 2b, the touch sensor panel 100 for detecting the touch position is disposed between the first glass layer 261 and the first polarizer layer 271. Here, the touch surface of the touch input device 1000 is the outer surface of the display module 200. The top surface or bottom surface of the display module 200 in FIG. 2b may be the touch surface. FIG. 2c shows that the touch sensor panel 100 for detecting the touch position is included in the liquid crystal layer 250. Also, according to the embodiment, the touch sensor panel 100 may be implemented such that the electrical devices for the operation of the display panel 200A are used for the touch sensing. Here, the touch surface of the touch input device 1000 is the outer surface of the display module 200. The top surface or bottom surface of the display module 200 in FIG. 2c may be the touch surface. In FIGS. 2b and 2c, the top surface or bottom surface of the display module 200, which can be the touch surface, may be covered with a cover layer (not shown) such as glass.

FIG. 3 is a cross sectional view of the touch input device according to the embodiment of the present invention. According to the embodiment, in the touch input device 1000 according to the first example of the present invention, a complete lamination is made by an adhesive between the touch sensor panel 100 and the display module 200 for detecting the touch position. As a result, the display color clarity, visibility and optical transmittance of the display module 200, which can be recognized through the touch surface of the touch sensor panel 100, can be improved.

In FIG. 3 and the following description, it is shown that as the touch input device 1000 according to the embodiment of the present invention, the touch sensor panel 100 is laminated and attached on the display module 200 by means of an adhesive. However, the touch input device 1000 according to the embodiment of the present invention may include, as shown in FIGS. 2b and 2c, that the touch sensor panel 100 is disposed inside the display module 200. More specifically, while FIG. 3 shows that the touch sensor panel 100 covers the display module 200, the touch input device 1000 which includes the touch sensor panel 100 disposed inside the display module 200 and includes the display module 200 covered with a cover layer such as glass may be used as the embodiment of the present invention.

The touch input device 1000 according to the embodiment of the present invention may include an electronic device including the touch screen, for example, a cell phone, a personal data assistant (PDA), a smart phone, a tablet personal computer, an MP3 player, a laptop computer, etc.

In the touch input device 1000 according to the embodiment of the present invention, a substrate 300, together with an outermost cover 320 of the touch input device 1000, functions as, for example, a housing which surrounds a mounting space 310, etc., where the circuit board and/or battery for operation of the touch input device 1000 are placed. The substrate 300 may be a mid-frame in the touch input device. Here, the circuit board for operation of the touch input device 1000 may be a main board. A central processing unit (CPU), an application processor (AP) or the like may be mounted on the circuit board. Due to the substrate 300, the display module 200 is separated from the circuit board and/or battery for operation of the touch input device 1000. Due to the substrate 300, electrical noise generated from the display module 200 can be blocked.

The touch sensor panel 100 or front cover layer of the touch input device 1000 may be formed wider than the display module 200, the substrate 300, and the mounting space 310. As a result, the cover 320 is formed such that the cover 320, together with the touch sensor panel 100, surrounds the display module 200, the substrate 300, and the mounting space 310.

The touch input device 1000 including the touch sensor panel 100 capable of detecting whether the touch has occurred or not and where the touch has occurred has been described up to now. By applying the pressure detection module according to the embodiment of the present invention to the above-mentioned touch input device 1000, it is possible to easily detect a magnitude of a touch pressure as well as whether the touch has occurred or not and/or where the touch has occurred. In particular, the touch input device 1000 may be manufactured such that an elastic material is inserted between the substrate 300 and the display module 200 for the purpose of mitigating the impact on the display module 200 and of maintaining the image quality of the display panel 200A. The embodiment intends to mitigate the impact on the display module 200, to ensure the quality of the display module and to stably maintain a gap for pressure detection by combining the elastic material with the pressure detection module 400. Hereafter, a case where the touch pressure is detected by applying the pressure detection module according to the embodiment of the present invention to the touch input device 1000 will be described in detail by an example.

FIGS. 4a to 4d show examples of the arrangement of pressure electrodes included in a pressure detection module which can be applied to the touch input device 1000 according to the embodiment of the present invention. First, hereafter, a principle in which the pressure is detected according to the arrangement of the pressure electrode will be described.

FIG. 4a shows that the pressure electrodes are arranged in the touch input device 1000 in accordance with a first embodiment of the present invention. A spacer layer 420 may be disposed between the display module 200 and the substrate 300. As shown in FIG. 4a, the pressure electrodes 450 and 460 arranged according to the first embodiment may be placed between the display module 200 and the substrate 300 and may be disposed on the substrate 300 side.

The pressure electrode for detecting the pressure may include the first electrode 450 and the second electrode 460. Here, any one of the first and the second electrodes 450 and 460 may be a drive electrode and the other may be a receiving electrode. A driving signal is applied to the drive electrode, and a sensing signal may be obtained through the receiving electrode. When voltage is applied, the mutual capacitance may be generated between the first electrode 450 and the second electrode 460.

FIG. 4b is a cross sectional view when a pressure is applied to the touch input device 1000 shown in FIG. 4a. The bottom surface of the display module 200 may have a ground potential so as to block the noise. When the pressure is applied to the surface of the touch sensor panel 100 by an object 500, the touch sensor panel 100 and the display module 200 may be bent. As a result, a distance "d" between the ground potential surface, i.e., a reference potential layer, and the pressure electrode patterns 450 and 460 may be decreased to "d'". In this case, due to the decrease of the distance "d", the fringing capacitance is absorbed in the bottom surface of the display module 200, so that the mutual capacitance between the first electrode 450 and the second electrode 460 may be reduced. Therefore, the magnitude of the touch pressure can be calculated by obtaining the reduction amount of the mutual capacitance from the sensing signal obtained through the receiving electrode.

In the touch input device 1000 according to the embodiment of the present invention, the display module 200 may be bent by the touch pressure. The display module 200 may be bent in such a manner as to show the biggest transformation at the touch position. When the display module 200 is bent according to the embodiment, a position showing the biggest transformation may not match the touch position.

However, the display module 200 may be shown to be bent at least at the touch position. For example, when the touch position approaches close to the border, edge, etc., of the display module 200, the most bent position of the display module 200 may not match the touch position, however, the display module 200 may be shown to be bent at least at the touch position.

FIG. 4c shows that the pressure electrodes are arranged in the touch input device 1000 in accordance with a second embodiment of the present invention. As shown in FIG. 4c, the pressure electrodes 450 and 460 arranged according to the second embodiment may be placed between the display module 200 and the substrate 300 and may be disposed on the display module 200 side.

Although the pressure electrodes 450 and 460 are formed on the substrate 300 in the first embodiment, the pressure electrodes 450 and 460 may be allowed to be formed on the bottom surface of the display module 200. Here, the substrate 300 may have the ground potential as a reference potential layer. Therefore, a distance "d" between the substrate 300 and the pressure electrodes 450 and 460 is reduced by touching the touch surface of the touch sensor panel 100. Consequently, this may cause the change of the mutual capacitance between the first electrode 450 and the second electrode 460.

FIG. 4d shows that the pressure electrodes are arranged in the touch input device 1000 in accordance with a third embodiment of the present invention. In the third embodiment, any one of the first electrode 450 and the second electrode 460, which are pressure electrodes, may be formed on the substrate 300, and the other may be formed on the bottom surface of the display module 200. FIG. 4d shows that the first electrode 450 is formed on the substrate 300 side, and the second electrode 460 is formed on the bottom surface of the display module 200 side.

When a pressure is applied to the surface of the touch sensor panel 100 by the object 500, the touch sensor panel 100 and the display module 200 may be bent. As a result, a distance "d" between the first electrode 450 and the second electrode 460 may be reduced. In this case, the mutual capacitance between the first electrode 450 and the second electrode 460 may be increased with the reduction of the distance "d". Therefore, the magnitude of the touch pressure can be calculated by obtaining the increase amount of the mutual capacitance from the sensing signal obtained through the receiving electrode.

FIGS. 5a to 5e show the patterns of the pressure electrode included in the pressure detection module according to the embodiment of the present invention.

FIGS. 5a to 5c show the pressure electrode pattern which can be applied to the first and the second embodiments. When the magnitude of the touch pressure is detected as the mutual capacitance between the first electrode 450 and the second electrode 460 is changed, it is necessary to form the patterns of the first electrode 450 and the second electrode 460 so as to generate the range of the capacitance required to improve the detection accuracy. With the increase of a facing area or facing length of the first electrode 450 and the second electrode 460, the size of the capacitance that is generated may become larger. Therefore, the pattern can be designed by adjusting the size of the facing area, facing length and facing shape of the first electrode 450 and the second electrode 460 in accordance with the range of the necessary capacitance. FIGS. 5b and 5c show that the first electrode 450 and the second electrode 460 are formed in the same layer, and show that the pressure electrode is formed such that the facing length of the first electrode 450 and the second electrode 460 becomes relatively longer. When the first and the second pressure electrodes 450 and 460 are located in different layers, they can be implemented so as to overlap each other.

In the first and the second embodiments, it is shown that the touch pressure is detected from the change of the mutual capacitance between the first electrode 450 and the second electrode 460. However, the pressure electrodes 450 and 460 may be configured to include only any one of the first electrode 450 and the second electrode 460. In this case, it is possible to detect the magnitude of the touch pressure by detecting the change of the capacitance between the one pressure electrode and a ground layer (either the display module 200 or the substrate 300).

For instance, in FIGS. 4a to 4c, the pressure electrode may be configured to include only the first electrode 450. Here, the magnitude of the touch pressure can be detected by the change of the capacitance between the first electrode 450 and the ground layer, i.e., the reference potential layer, which is caused by a distance change between the display module 200 and the first electrode 450. Since the distance "d" is reduced with the increase of the touch pressure, the capacitance between the reference potential layer and the first electrode 450 may be increased with the increase of the touch pressure. Here, the pressure electrode should not necessary have a comb teeth shape or a trident shape, which is required to improve the detection accuracy of the mutual capacitance change amount. The pressure electrode may have, as shown in FIG. 5d, a plate shape (e.g., quadrangular plate).

FIG. 5e shows a pressure electrode pattern which can be applied to the third embodiment of the present invention. Since the first electrode 450 and the second electrode 460 are disposed in different layers, they can be implemented so as to overlap each other. As shown in FIG. 5e, the first electrode 450 and the second electrode 460 are disposed perpendicular to each other, so that the capacitance change amount detection sensitivity can be enhanced. In the third embodiment, the first electrode 450 and the second electrode 460 may be, as shown in FIG. 5d, implemented to have a plate shape.

As described above, the pressure detection module 400 for detecting the pressure in the touch input device 1000 may include the pressure electrodes 450 and 460 and the spacer layer 420. In the foregoing, the spacer 420 is shown as a space between the substrate 300 and the display module 200. Also, the spacer 420 may be referred to as a component which is located between the pressure electrodes 450 and 460 and the reference potential layer (e.g., substrate 300 or the display module 200) and may be pressed according to the touch with a pressure.

Here, when the magnitude of the touch pressure on the touch input device 1000 is detected through the pressure electrodes 450 and 460, the spacer layer 420 needs to have a uniform bent degree and a uniform restoring force so as to have a uniform detection performance. For example, when the touch input device 1000 is touched several times with a pressure having the same magnitude, the spacer layer 420 should be uniformly pressed in order to detect every time the pressure having the same magnitude. For instance, when the spacer layer 420 is transformed by the repeated touches so that a gap of the spacer layer 420 is reduced, the uniform performance of the pressure detection module 400 cannot be ensured. Therefore, it is important to stably obtain the gap of the spacer layer 420 in order to ensure the pressure detection performance of the pressure detection module 400.

As a result, in the embodiment, an elastic foam having a quick restoring force may be used as the spacer layer 420.

The pressure detection module 400 having the elastic foam according to the embodiment may be disposed between the display module 200 and the substrate 300 of the touch input device 1000. The pressure detection module 400 is configured to have the elastic foam, so that it is possible to mitigate the impact on the display module 200 even without inserting an additional elastic material between the display module 200 and the substrate 300 and to maintain the image quality of the display panel 200A.

Here, the elastic foam included in the pressure detection module 400 according to the embodiment should have a flexibility for allowing the shape thereof to be changed when pressed by applying the impact, etc., thereby functioning to absorb the impact, and should have a restoring force, thereby providing the uniform performance for pressure detection.

Also, the elastic foam should be thick enough to mitigate the impact applied to the display module 200 and should be also thick enough to prevent a distance between the pressure electrodes 450 and 460 and the reference potential layer from being too large, for the purpose of improving a pressure detection sensitivity. For example, the elastic foam according to the embodiment may have a thickness of from 10 μm to 1 mm. If the thickness of the elastic foam is less than 10 μm, the impact cannot be sufficiently absorbed, and if larger than 1 mm, the distance between the reference potential layer and the pressure electrodes 450 and 460 or between the first electrode and the second electrode becomes larger, so that the pressure detection sensitivity may be decreased.

For example, the elastic foam according to the embodiment may include at least any one of polyurethane, polyester, polypropylene, and acrylic.

FIGS. 6a and 6b show the attachment position of the pressure detection module 400 to the touch input device according to the embodiment of the present invention. As shown in FIG. 6a, the pressure detection module 400 may be attached to the top surface of the substrate 300. Also, as shown in FIG. 6b, the pressure detection module 400 may be attached to the bottom surface of the display module 200. Hereafter, the case where the pressure detection module 400 is attached to the top surface of the substrate 300 will be described first.

FIGS. 7a to 7f show a structural cross section of the pressure detection module according to the embodiment of the present invention.

As shown in FIG. 7a, in the pressure detection module 400 according to the embodiment, the pressure electrodes 450 and 460 are located between a first insulation layer 410 and a second insulation layer 411. For example, after the pressure electrodes 450 and 460 are formed on the first insulation layer 410, the pressure electrodes 450 and 460 may be covered with the second insulation layer 411. Here, the first insulation layer 410 and the second insulation layer 411 may be made of an insulating material such as polyimide. The first insulation layer 410 may be polyethylene terephthalate (PET), and the second insulation layer 411 may be a cover layer made of ink. The pressure electrodes 450 and 460 may include a material such as copper or aluminum. According to the embodiment, adhesion is performed between the first insulation layer 410 and the second insulation layer 411 and between the pressure electrodes 450 and 460 and the first insulation layer 410 by means of an adhesive (not shown) such as a liquid bond. Also, according to the embodiment, the pressure electrodes 450 and 460 according to the embodiment may be formed by positioning a mask, which has a through-hole corresponding to a pressure electrode pattern, on the first insulation layer 470, and then by spraying a conductive material.

In FIG. 7a, the pressure detection module 400 further includes the elastic foam 440. The elastic foam 440 may be formed on one side of the second insulation layer 411 in a direction opposite to the first insulation layer 410. Later, when the pressure detection module 400 is attached to the substrate 300, the elastic foam 440 may be disposed on the substrate 300 on the basis of the second insulation layer 411.

Here, an adhesive tape 430 having a predetermined thickness may be formed on the outside of the elastic foam 440 so as to attach the pressure detection module 400 to the substrate 300. According to the embodiment, the adhesive tape 430 may be a double adhesive tape. Here, the adhesive tape 430 may function to adhere the elastic foam 440 to the second insulation layer 411. Here, the adhesive tape 430 is disposed on the outside of the elastic foam 440, thereby effectively reducing the thickness of the pressure detection module 400.

When the pressure detection module 400 shown in FIG. 7a is attached to the substrate 300 located in the lower part of FIG. 7a, the pressure electrodes 450 and 460 may operate to detect the pressure as described with reference to FIG. 4c. For example, the pressure electrodes 450 and 460 is disposed on the display module 200 side, and the reference potential layer may correspond to the surface of the substrate 300 and the elastic foam 440 may perform an action corresponding to the spacer layer 420. For instance, when the top of the touch input device 1000 is touched, the elastic foam 440 is pressed and then the distance between the substrate 300, i.e., the reference potential layer and the pressure electrodes 450 and 460 is reduced. As a result, the mutual capacitance between the first electrode 450 and the second electrode 460 may be reduced. Through this capacitance change, the magnitude of the touch pressure can be detected.

The pressure detection module of FIG. 7b is similar to the pressure detection module 400 shown in FIG. 7a. Hereafter, the following description will focus on the differences between them. Unlike FIG. 7a, the pressure detection module 400 is not attached to the substrate 300 by means of the adhesive tape 430 disposed on the outside of the elastic foam 440 in FIG. 7b. FIG. 7b may include a first adhesive tape 431 for adhering the elastic foam 440 to the second insulation layer 411, and a second adhesive tape 432 for adhering the pressure detection module 400 to the substrate 300. The second adhesive tape 432 is placed on the elastic foam 440. As such, the first and the second adhesive tapes 431 and 432 are disposed, thereby securely attaching the elastic foam 440 to the second insulation layer 411 and thereby securely attaching the pressure detection module 400 to the substrate 300. According to the embodiment, the pressure detection module 400 shown in FIG. 7b may not include the second insulation layer 411. For example, the first adhesive tape 431 may not only functions as a cover layer which directly covers the pressure electrodes 450 and 460, but also function to attach the elastic foam 440 to the first insulation layer 410 and the pressure electrodes 450 and 460. This can be applied to the following FIGS. 7c to 7f.

FIG. 7c shows a modified example of the structure shown in FIG. 7a. In FIG. 7c, the elastic foam 440 has a hole H formed therein to have a length as long as the height of the elastic foam 440, so that the elastic foam 440 can be well pressed when the touch input device 1000 is touched. The hole H may be filled with air. When the elastic foam 440 is well pressed, the pressure detection sensitivity may be improved. Also, the hole H formed in the elastic foam 440 makes it possible to prevent the surface of the elastic foam 440 from protruding due to the air at the time of attaching the pressure detection module 400 to the substrate 300, etc.

In FIG. 7c, the first adhesive tape 431 as well as the adhesive tape 430 may be further included in order to securely adhere the elastic foam 440 to the second insulation layer 411.

FIG. 7d shows a modified example of the structure shown in FIG. 7b. As with FIG. 7c, the elastic foam 440 has the hole H formed therein to have a length as long as the height of the elastic foam 440.

FIG. 7e shows a modified example of the structure shown in FIG. 7d. A second elastic foam 441 is further included on one side of the first insulation layer 410, that is, the opposite side to the elastic foam 440. The second elastic foam 441 may be further formed to minimize the impact transmitted to the display module 200 when the pressure detection module 400 is attached later to the touch input device 1000. Here, a third adhesive tape 433 may be further included in order to adhere the second elastic foam 441 to the first insulation layer 410.

FIG. 7f shows the structure of the pressure detection module 400 capable of detecting the pressure as described with reference to FIG. 4d. FIG. 7f shows the structure of the pressure detection module 400 in which the first electrodes 450 and 451 and the second electrodes 460 and 461 are disposed with the elastic foam 440 placed therebetween. Similarly to the structure described with reference to FIG. 7b, the first electrodes 450 and 451 are formed between the first insulation layer 410 and the second insulation layer 411, and the first adhesive tape 431, the elastic foam 440, and the second adhesive tape 432 may be formed. The second electrodes 460 and 461 are formed between a third insulation layer 412 and a fourth insulation layer 413, and the fourth insulation layer 413 may be attached to one side of the elastic foam 440 by means of the second adhesive tape 432. Here, the third adhesive tape 433 may be formed on the substrate-side surface of the third insulation layer 412, and the pressure detection module 400 may be attached to the substrate 300 by means of the third adhesive tape 433. As described with reference to FIG. 7b, according to the embodiment, the pressure detection module 400 shown in FIG. 7f may not include the second insulation layer 411 and/or the fourth insulation layer 413. For example, the first adhesive tape 431 may not only functions as a cover layer which directly covers the first electrodes 450 and 451, but also function to attach the elastic foam 440 to the first insulation layer 410 and the first electrodes 450 and 451. Also, the second adhesive tape 432 may not only functions as a cover layer which directly covers the second electrodes 460 and 461, but also function to attach the elastic foam 440 to the third insulation layer 412 and the second electrodes 460 and 461.

Here, the elastic foam 440 is pressed by the touch on the touch input device 1000, and thus, the mutual capacitance between the first electrodes 450 and 451 and the second electrodes 460 and 461 may be increased. Through this capacitance change, the touch pressure can be detected. Also, according to the embodiment, any one of the first electrode 450 and 451 and the second electrode 460 and 461 is grounded, and thus, a magnetic capacitance can be detected by the other electrode.

In FIG. 7f, the thickness and manufacturing cost of the pressure detection module 400 become larger than those of a case where the electrode is formed in the form of a single layer. However, it is possible to ensure the pressure detection performance which is not changed by the characteristics of the reference potential layer located outside the pressure detection module 400. That is, the pressure detection module 400 is configured as shown in FIG. 7f, so that an effect due to an external potential (ground) environment can be minimized at the time of detecting the pressure. Therefore, the same pressure detection module 400 can be used regardless of the kind of the touch input device 1000 to which the pressure detection module 400 is applied.

FIGS. 8a and 8b show that the pressure detection module according to the embodiment of the present invention is attached to the substrate opposite to the display module. FIG. 8a shows that the pressure detection module 400 having the structure shown in FIG. 7b is attached to the top surface of the substrate 300. FIG. 8b shows that the pressure detection module 400 having the structure shown in FIG. 7b is attached to the top surface of the substrate 300. Here, an air gap may be located between the pressure detection module 400 and the display module 200 in accordance with the manufacturing process of the touch input device 1000. Even though the air gap is pressed by the touch, the distance between the pressure electrodes 450 and 460 and the substrate 300 is small, so that the pressure detection performance is not much affected.

FIG. 8a shows a case where the substrate 300 functions as a reference potential layer. According to the embodiment, the modified structures of FIGS. 7a to 7d can be attached to the substrate 300. Though FIG. 8a shows that, in the pressure detection module 400, the elastic foam 440 is formed relatively closer to the substrate 300 than the pressure electrodes 450 and 460, the pressure detection module 400 in which the elastic foam 440 is formed relatively closer to the display module 200 than the pressure electrodes 450 and 460 may be attached to the substrate 300. That is, the elastic foam 440 may be formed on the first insulation layer 410. In this case, the reference potential layer may be the display module 200.

FIGS. 9a and 9b show that the pressure detection module according to the embodiment of the present invention is attached to the display module.

The pressure detection module 400 having the structure shown in FIGS. 7a to 7e may be turned upside down and be attached to the display module 200. FIG. 9a shows that the pressure detection module 400 having the structure shown in FIG. 7b is turned upside down and is attached to the display module 200. Here, the elastic foam 440 is pressed by the touch, so that the distance between the pressure electrodes 450 and 460 and the display module 200, i.e., a reference potential layer is reduced. Thus, the mutual capacitance between the first electrode 450 and the second electrode 460 may be reduced. Through this capacitance change, the touch pressure can be detected.

According to the embodiment, the modified structure of the pressure detection module 400 can be used. FIG. 9b shows that the modified structure of the pressure detection module 400 shown in FIG. 7b is turned upside down and is attached to the display module 200. In FIG. 9b, the pressure detection module 400 may be configured such that the elastic foam 440 is located between the pressure electrodes 450 and 460 and the substrate 300 instead of being located between the pressure electrodes 450 and 460 and the display module 200. In this case, a reference potential layer for detecting the pressure may be the substrate 300. Therefore, the elastic foam 440 is pressed by the touch and the distance between the pressure electrodes 450 and 460 and the substrate 300, i.e., a reference potential layer is reduced. As a result, the mutual capacitance between the first electrode 450 and the second electrode 460 may be reduced. Through this capacitance change, the touch pressure can be detected. In this case, the air gap which may be located between the substrate 300 and the pressure detection module 400 can be also used, together with the elastic foam 440, to induce the capacitance change caused by the touch.

The above-described pressure detection module 400 has been described by assuming that the touch occurs on the top surface of the display module. Besides, the pressure detection module 400 according to the embodiment can be modified to detect the touch pressure even when the pressure is applied to the bottom surface of the touch input device 1000.

As described above, in order to detect the pressure through the touch input device 1000 to which the pressure detection module 400 is applied according to the embodiment of the present invention, it is necessary to sense the change of the capacitance occurring at the pressure electrodes 450 and 460. Therefore, it is necessary for the driving signal to be applied to the drive electrode out of the first and second electrodes 450 and 460, and it is required to detect the touch pressure by the capacitance change amount by obtaining the sensing signal from the receiving electrode. According to the embodiment, it is possible to additionally include a pressure detection device in the form of a pressure sensing IC for the operation of the pressure detection. The pressure detection module 400 according to the embodiment of the present invention may include not only the structure shown in FIG. 7, etc., including the pressure electrodes 450 and 460 for pressure detection but also the pressure detection device.

In this case, the touch input device repeatedly has a configuration similar to the configuration of FIG. 1 including the drive unit 120, sensing unit 110, and controller 130, so that the area and volume of the touch input device 1000 increase.

According to the embodiment, the touch detection device 1000 may apply the driving signal for pressure detection to the pressure electrodes 450 and 460 by using the touch detection device for the operation of the touch sensor panel 100, and may detect the touch pressure by receiving the sensing signal from the pressure electrodes 450 and 460. Hereafter, the following description will be provided by assuming that the first electrode 450 is the drive electrode and the second electrode 460 is the receiving electrode.

For this, in the touch input device 1000 to which the pressure detection module 400 is applied according to the embodiment of the present invention, the driving signal may be applied to the first electrode 450 from the drive unit 120, and the second electrode 460 may transmit the sensing signal to the sensing unit 110. The controller 130 may perform the scanning of the touch sensor panel 100, and simultaneously perform the scanning of the touch pressure detection, or the controller 130 performs the time-sharing, and then may generate a control signal such that the scanning of the touch sensor panel 100 is performed in a first time interval and the scanning of the pressure detection is performed in a second time interval different from the first time interval.

Therefore, in the embodiment of the present invention, the first electrode 450 and the second electrode 460 should be electrically connected to the drive unit 120 and/or the sensing unit 110. Here, it is common that the touch detection device for the touch sensor panel 100 corresponds to the touch sensing IC 150 and is formed on one end of the touch sensor panel 100 or on the same plane with the touch sensor panel 100. The pressure electrode 450 and 460 included in the pressure detection module 400 may be electrically connected to the touch detection device of the touch sensor panel 100 by any method. For example, the pressure electrode 450 and 460 may be connected to the touch detection device through a connector by using the second PCB 210 included in the display module 200.

FIGS. 10a to 10b show that the pressure detection module 400 including the pressure electrodes 450 and 460 is attached to the bottom surface of the display module 200. FIGS. 10a and 10b show the second PCB 210 on which a circuit for the operation of the display panel has been mounted is disposed on a portion of the bottom surface of the display module 200.

FIG. 10a shows that the pressure detection module 400 is attached to the bottom surface of the display module 200 such that the first electrode 450 and the second electrode 460 are connected to one end of the second PCB 210 of the display module 200. A conductive pattern may be printed on the second PCB 210 in such a manner as to electrically connect the pressure electrodes 450 and 460 to a necessary component like the touch sensing IC 150, etc. The detailed description of this will be provided with reference to FIGS. 11a to 11c. An attachment method of the pressure detection module 400 including the pressure electrodes 450 and 460 shown in FIG. 10a can be applied in the same manner to the substrate 300.

FIG. 10b shows that the pressure detection module 400 including the first and the second electrodes 450 and 460 is integrally formed on the second PCB 210 of the display module 200. For example, when the second PCB 210 of the display module 200 is manufactured, a certain area 211 is separated from the second PCB, and then not only the circuit for the operation of the display panel but also the pattern corresponding to the first electrode 450 and the second electrode 460 can be printed on the area 211. A conductive pattern may be printed on the second PCB 210 in such a manner as to electrically connect the first electrode 450 and the second electrode 460 to a necessary component like the touch sensing IC 150, etc.

FIGS. 11a to 11c show a method for connecting the pressure electrodes 450 and 460 to the touch sensing IC 150. In FIGS. 11a to 11c, the touch sensor panel 100 is included outside the display module 200. FIGS. 11a to 11c show that the touch detection device of the touch sensor panel 100 is integrated in the touch sensing IC 150 mounted on the first PCB 160 for the touch sensor panel 100.

FIG. 11a shows that the pressure electrodes 450 and 460 attached to the display module 200 are connected to the touch sensing IC 150 through a first connector 121. As shown in FIG. 11a, in a mobile communication device such as a smart phone, the touch sensing IC 150 is connected to the second PCB 210 for the display module 200 through the first connector 121. The second PCB 210 may be electrically connected to the main board through a second connector 224. Therefore, through the first connector 121 and the second connector 224, the touch sensing IC 150 may transmit and receive a signal to and from the CPU or AP for the operation of the touch input device 1000.

Here, while FIG. 11a shows that the pressure detection module 400 is attached to the display module 200 by the method shown in FIG. 10b, the first electrode 450 can be attached to the display module 200 by the method shown in FIG. 10a. A conductive pattern may be printed on the second PCB 210 in such a manner as to electrically connect the first electrode 450 and the second electrode 460 to the touch sensing IC 150 through the first connector 121.

FIG. 11b shows that the pressure electrodes 450 and 460 attached to the display module 200 are connected to the touch sensing IC 150 through a third connector 473. In FIG. 11b, the pressure electrodes 450 and 460 may be connected to the main board for the operation of the touch input device 1000 through the third connector 473, and in the future, may be connected to the touch sensing IC 150 through the second connector 224 and the first connector 121. Here, the pressure electrodes 450 and 460 may be printed on an additional PCB separated from the second PCB 210. Otherwise, according to the embodiment, the pressure electrodes 450 and 460 may be attached to the touch input device 1000 in the structure shown in FIG. 7 and may be connected to the main board through the connector 473 by extending the conductive trace, etc., from the pressure electrodes 450 and 460.

Even when the pressure electrodes 450 and 460 are printed on the second PCB 210 or on the additional PCB separated from the second PCB, the pressure electrodes 450 and 460 and a portion of the PCB in which the pressure electrodes 450 and 460 have been printed may be collectively referred to as the pressure detection module 400.

FIG. 11c shows that the pressure electrodes 450 and 460 are directly connected to the touch sensing IC 150 through a fourth connector 474. In FIG. 11c, the pressure electrodes 450 and 460 may be connected to the first PCB 160 through the fourth connector 474. A conductive pattern may be printed on the first PCB 160 in such a manner as to electrically connect the fourth connector 474 to the touch sensing IC 150. As a result, the pressure electrodes 450 and 460 may be connected to the touch sensing IC 150 through the fourth connector 474. Here, the pressure electrodes 450 and 460 may be printed on the additional PCB separated from the second PCB 210. The second PCB 210 may be insulated from the additional PCB so as not to be short-circuited with each other. Also, according to the embodiment, the pressure electrodes 450 and 460 may be attached to the touch input device 1000 in the structure shown in FIG. 7 and may be connected to the first PCB 160 through the fourth connector 474 by extending the conductive trace, etc., from the pressure electrodes 450 and 460.

The connection method of FIGS. 11b and 11c can be applied to the case where the pressure electrode 450 and 460 are formed on the substrate 300 as well as on the bottom surface of the display module 200.

FIGS. 11a to 11c have been described by assuming that a chip on board (COB) structure in which the touch sensing IC 150 is formed on the first PCB 160. However, this is just an example. The present invention can be applied to the chip on board (COB) structure in which the touch sensing IC 150 is mounted on the main board within the mounting space 310 of the touch input device 1000. It will be apparent to those skilled in the art from the descriptions of FIGS. 11a to 11c that the connection of the pressure electrodes 450 and 460 through the connector can be also applied to another embodiment.

The foregoing has described the pressure electrodes 450 and 460, that is to say, has described that the first electrode 450 constitutes one channel as the drive electrode and the second electrode 460 constitutes one channel as the receiving electrode. However, this is just an example. According to the embodiment, the drive electrode and the receiving electrode constitute a plurality of channels respectively, so that it is possible to detect a pressure of each of touches in a multi touch.

FIGS. 12a to 12c show that the pressure electrode of the present invention constitutes the plurality of channels. FIG. 12a shows first electrodes 450-1 and 450-2 and second electrodes 460-1 and 460-2 constitute two channels respectively. FIG. 12a shows that the first electrode 450-1 and the second electrode 460-1 which constitute a first channel are included in the first pressure detection module 400, and the first electrode 450-2 and the second electrode 460-2 which constitute a second channel are included in the second pressure detection module 400. However, all of the first electrodes 450-1 and 450-2 and the second electrodes 460-1 and 460-2 which constitute the two channels may be included in one pressure detection module 400. FIG. 12b shows that the first electrode 450-1 and 450-2 constitutes two channels and the second electrode 460 constitutes one channel. FIG. 12c shows the first electrode 450-1 to 450-5 constitute five channels and the second electrode 460-1 to 460-5 constitute five channels. Even in this case, all of the electrodes constituting the five channels may be also included in one pressure detection module 400.

FIGS. 12a to 12c show that the pressure electrode constitutes a single or a plurality of channels. The pressure electrode may be comprised of a single or a plurality of channels by a variety of methods. While FIGS. 12a to 12c do not show that the pressure electrodes 450 and 460 are electrically connected to the touch sensing IC 150, the pressure electrodes 450 and 460 can be connected to the touch sensing IC 150 by the method shown in FIGS. 11a to 11c and other methods.

As described above, by applying the pressure detection module 400 according to the embodiment of the present invention to the existing touch input device 1000 including the touch sensor panel detecting whether or not the touch has occurred and where the touch has occurred, the touch pressure can be easily detected through the corresponding touch input device 1000. After the existing touch input device 1000 is minimally changed, the pressure detection module 400 according to the embodiment of the present invention is disposed. As a result, it is possible to detect the touch pressure by using the existing touch input device 1000.

Experiments of FIGS. 13a to 13c are performed for the touch input device 1000 having the structure shown in FIG. 8a. In the following experiments, the elastic foam 440 included in the pressure detection module 400 is manufactured, including polypropylene.

FIG. 13a is a graph showing capacitance change differences normalized in accordance with the weight of a pressure touch on the touch input device including the pressure detection module according to the embodiment of the present invention. FIG. 13a is a graph showing normalized differences of the change of the capacitance generated between the first electrode 450 and the second electrode 460, which is calculated by the pressure detection device when the touch surface of the touch input device 1000 is touched with a pressure of 0 gf (gram force), 100 gf, . . . , 1000 gf. Here, the capacitance change difference means that a change difference between a case where the touch input device 1000 is touched with 0 gf and a case where the touch input device 1000 is touched with a gram force of a corresponding weight. Even though the capacitance change difference is not changed in direct proportion to the magnitude of the weight of the touch on the touch input device 1000, the capacitance change difference is changed in a monotonically increasing form, so that it is possible to detect the magnitude of the pressure at the time of touching the touch input device 1000 according to the embodiment of the present invention.

FIG. 13b is a graph which shows capacitance change differences normalized in accordance with the pressure touch before and after a predetermined number of the pressure touches occur on the touch input device including the pressure detection module according to the embodiment of the present invention, and shows deviations between the capacitance changes. The experiment of FIG. 13b is performed on four sets of the touch input devices 1000 respectively. In the upper graph of FIG. 13b, "A" and "B" represent before and after the touch input device 1000 according to the embodiment of the present invention is touched hundred thousand times with a pressure of 800 gf. Each of "A" and "B" represents a value obtained by normalizing differences of the change of the capacitance generated between the first electrode 450 and the second electrode 460, which is calculated by the pressure detection device when the touch surface of the touch input device 1000 is touched with a pressure of 800 gf. It can be seen that though the difference values of the change of the capacitance generated before "A" and after "B" the touch occurs hundred thousand times are not the same, the deviations of the difference values are very small.

The lower graph of FIG. 13b shows deviations between the difference values of the change of the capacitance of "A" and "B". It can be found that the deviations between the difference values of the change of the capacitance generated before and after the touch input device 1000 according to the embodiment of the present invention is touched hundred thousand times is less than 5%. Through FIG. 13b, it can be understood that even when the pressure detection module 400 using the elastic foam according to the embodiment is used for a long time, the pressure detection performance can be uniformly maintained.

FIG. 13c is a graph showing a normalized pressure difference change which is detected by releasing the touch applied to the touch input device including the pressure detection module according to the embodiment of the present invention. In FIG. 13c, when the touch surface of the touch input device 1000 is touched with a pressure of 800 gf, the magnitude of the pressure calculated by the pressure detection device is represented by 1 and the magnitude change of the pressure calculated after the applied pressure is released is shown. Referring to FIG. 13c, it can be appreciated that a time required for the pressure difference to reach from 90% of 1, i.e., the maximum pressure magnitude, to 10% after the applied pressure is released is approximately 0.7 seconds. As such, since the elastic foam has a high restoring force after the pressure touch is released, when the pressure detection module 400 including the elastic foam according to the embodiment of the present invention is used, it is possible to prevent that a pressure detection accuracy is reduced by consecutive pressure touches. Here, a required restoring speed may be changed according to the embodiment. According to the embodiment, the time required for the pressure difference to reach from 90% of 1, i.e., the maximum pressure magnitude, to 10% may be less than 1 second.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch input device comprising:
    a cover layer;
    a touch sensor panel which is located under the cover layer for detecting a touch as input to the touch input device and comprises a touch drive electrode and a touch receive electrode;
    a display module;
    a pressure detection module which is located under the display module for detecting a pressure of the touch to the display module and is located under the touch sensor panel, wherein the pressure detection module being apart from the touch sensor panel; and
    a substrate which is located under the pressure detection module, such that the pressure detection module is attached either to the display module or to the substrate; and
    a supporting member,
    wherein the pressure detection module includes:
       a first insulation layer;
       a second insulation layer disposed under the first insulation layer;
       a pressure electrode which is located between the first insulation layer and the second insulation layer; and
       an elastic foam which is disposed between the second insulation layer and the substrate,
    wherein a capacitance between the pressure electrode and the substrate is changed according to a relative distance change between the substrate and the pressure electrode through a transformation of the elastic foam, wherein a magnitude of the pressure of the touch which causes the elastic foam to be transformed is detected according to the capacitance change,
    wherein a position of the touch is detected according to a capacitance change between the touch drive electrode and the touch receive electrode,
    wherein the supporting member is disposed on an outside of the elastic foam of the pressure detection module,
    wherein the supporting member is not disposed on an overall portion of the substrate, and
    wherein the elastic foam is transformed by bending the display module.

2. The touch input device of claim 1, wherein the elastic foam comprises at least any one of polyurethane, polyester, polypropylene, or acrylic.

3. The touch input device of claim 1, wherein the elastic foam is formed to have a thickness of from 10 μm to 1 mm.

4. The touch input device of claim 1, wherein the pressure electrode constitutes a plurality of channels.

5. The touch input device of claim 4, wherein
    the pressure detection module is configured to detect a pressure of each of a plurality of touches in a multi touch according to a change of a capacitance in corresponding at least one of the plurality of channels.

6. The touch input device of claim 1,
    wherein the supporting member is an adhesive tape to attach the pressure detection module to the substrate, and
    wherein the adhesive tape is disposed between the second insulation layer and the substrate at a location free of the elastic foam.

7. The touch input device of claim 6, wherein the adhesive tape is a double adhesive tape.

8. The touch input device of claim 1, wherein the first insulation layer comprises polyethylene terephthalate (PET).

9. The touch input device of claim 1, wherein the second insulation layer comprises polyimide.

10. The touch input device of claim 1, wherein
    the supporting member includes a first supporting member disposed on a first side of the pressure detection module and a second supporting member disposed on a second side of the pressure detection module, and the pressure detection module is free of a supporting member between the first side and the second side of the pressure detection module.

11. The touch input device of claim 1, wherein
the supporting member is disposed on a first surface of the substrate, and
the supporting member is not disposed on the entirety of the first surface of the substrate.

12. The touch input device of claim 1, wherein
wherein the supporting member is disposed on at least one of a left side or a right side of the pressure detection module between the pressure electrode and the substrate.

* * * * *